A. C. ROBERTSON AND F. VOLK.
LENS GRINDING AND POLISHING MACHINE.
APPLICATION FILED APR. 15, 1916.

1,318,300.

Patented Oct. 7, 1919.
5 SHEETS—SHEET 1.

Inventors.
Alexander Copland Robertson.
Frank Volk
By Hull, Smith, Brock & West
Atty's.

A. C. ROBERTSON AND F. VOLK.
LENS GRINDING AND POLISHING MACHINE.
APPLICATION FILED APR. 15, 1916.

1,318,300.

Patented Oct. 7, 1919.
5 SHEETS—SHEET 2.

Inventors.
Alexander Copland Robertson.
Frank Volk.
By Hull Smith Brock & West
Atty's

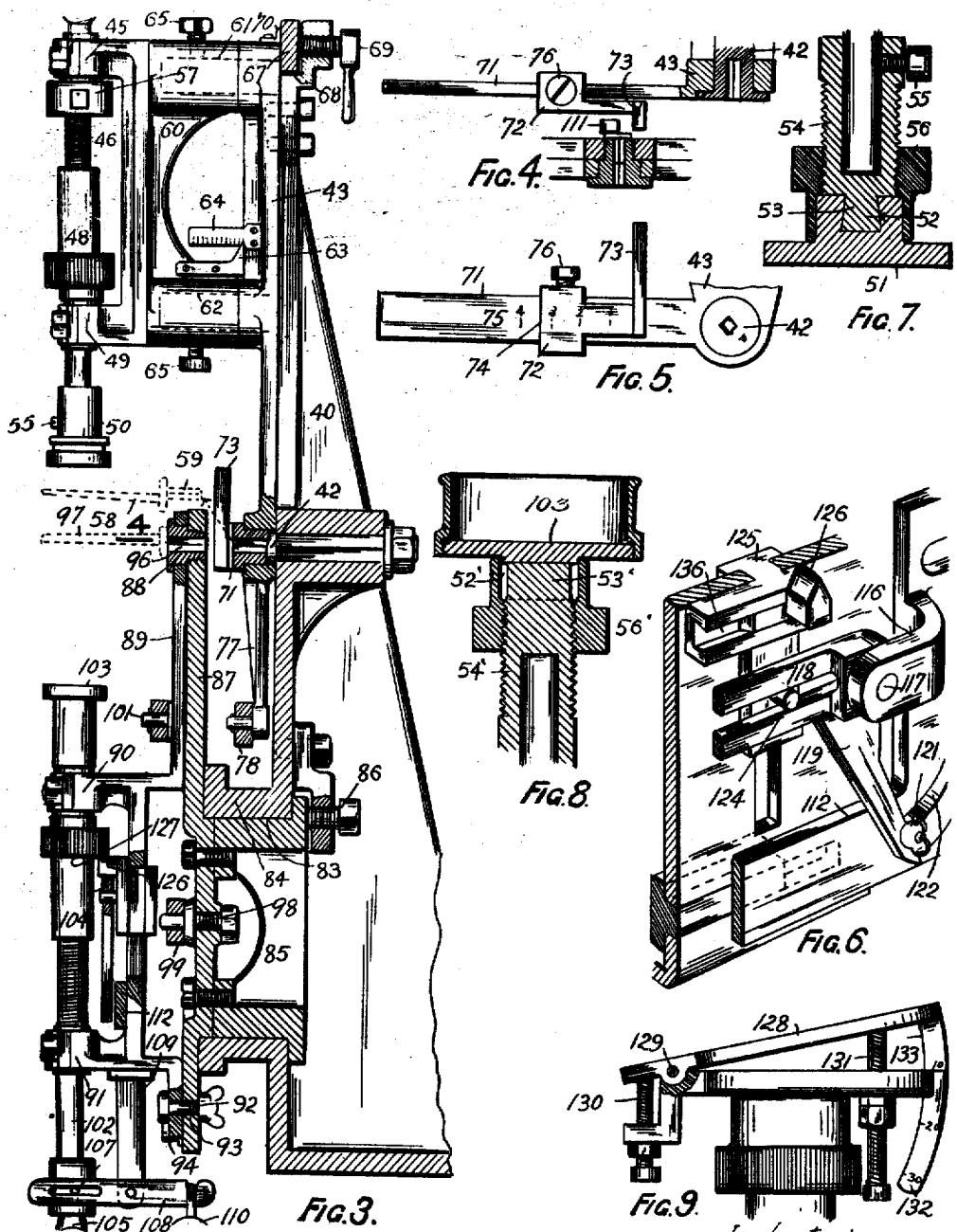

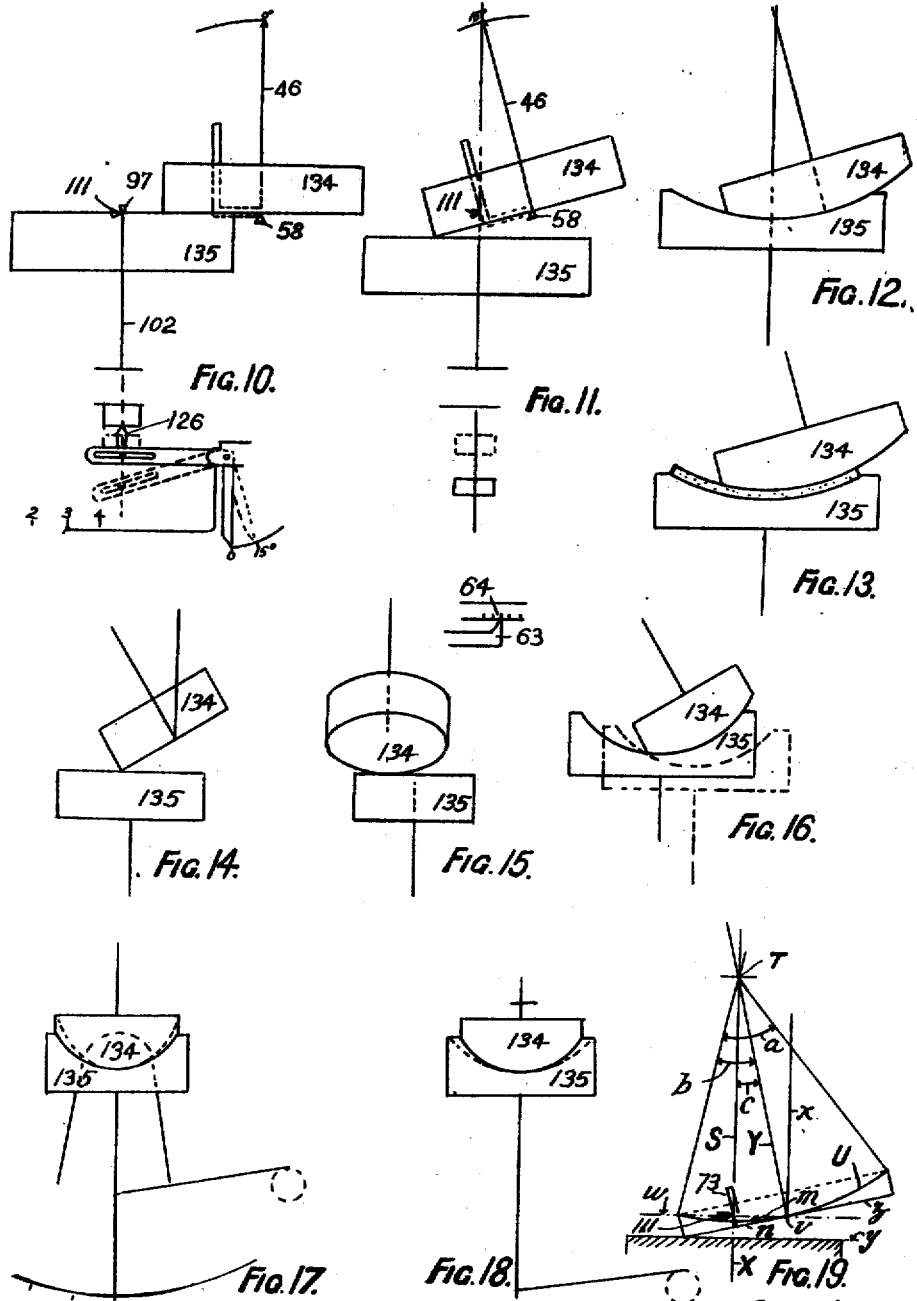

UNITED STATES PATENT OFFICE.

ALEXANDER COPLAND ROBERTSON, OF NORTH SYDNEY, AND FRANK VOLK, OF ENFIELD, NEW SOUTH WALES, AUSTRALIA, ASSIGNORS TO UNIVERSAL GRINDING MACHINE COMPANY, OF RENO, NEVADA, A CORPORATION OF NEVADA.

LENS GRINDING AND POLISHING MACHINE.

1,318,300.     Specification of Letters Patent.     Patented Oct. 7, 1919.

Application filed April 15, 1916. Serial No. 91,356.

*To all whom it may concern:*

Be it known that we, ALEXANDER COPLAND ROBERTSON and FRANK VOLK, subjects of the King of Great Britain and Ireland, residing at 59 Walker street, North Sydney, New South Wales, Australia, and Liverpool street, Enfield, New South Wales, Australia, respectively, have invented certain new and useful Improvements in Lens Grinding and Polishing Machines, of which the following is a specification.

This invention consists in a machine for grinding and polishing lenses, in which the required surfaces are ground and finished automatically to predetermined measurements by rotary rubbing contact (and in certain cases by linear rubbing contact) between two opposed lens blanks or between a lens blank and a self forming opposed grinding surface.

In previous attempts to devise a means for producing lenses automatically by rotating two blanks in grinding contact, the one against the other, no success was attained, for the reason that it was believed to be necessary to oscillate the spindle which carries the convexing member about a center at or about the center of revolution of the required lens while the opposed blanks were kept in motion. The known process was in effect a simple grinding process, in which, during the grinding, the convexing member was oscillated to and fro on a center on the radius of curvature of the required lens, while an opposed disk was maintained in grinding contact with its surface.

The machine is adapted for the grinding of spherical, spheroidal, cylindrical, toroidal, parabolic, and hyperbolic lenses; and also the production of plane and conical lens surfaces.

The blanks consist of glass (or natural pebble) disks of appropriate diameter and thickness. Two such blanks, or, in certain cases hereinafter defined, one such blank with a grinding or polishing disk which automatically forms its surface in the grinding operation, are carried on spindles and are rotated in grinding contact with each other.

The two chucks or face plates which carry the opposed blanks are mounted on the ends of spindles and means are provided for rotating each of said spindles as required. The one spindle with its chuck and the blank held thereon is herein designated the "positive"; the other spindle, with its chuck and the blank (or grinder substance) held thereon is herein designated the "negative."

In most cases the positive "blank" is circular, but it is not necessarily circular. In the case of toroidal and cylindrical lenses it is usually rectangular. The negative blank may in most cases be of any shape. For brevity however these blanks whether of glass or abradant material, as for instance emery, are referred to as "disks," but it is to be understood that it is not therefore suggested that they should necessarily be circular in section.

In this specification for brevity of description the normal position of the spindles when in alinement with each other is regarded and referred to as a vertical position, though it is obvious that their actual position relative to horizon is quite immaterial so long as their positions are correct in relation to each other. Any reference to the verticality or horizontality of any part must therefore be read on the assumption that the machine is erected and worked with its frame standing in a vertical position, as shown in the drawings.

The term grinding is to be construed so as to include polishing which is in effect a continuation of the grinding proper, using a polishing medium.

When the negative disk and the positive disk are both of glass, abradant powder is introduced during the grinding between the surfaces in contact.

According to our invention, correct spherical forms are produced without oscillating either blank during the grinding, provided the positive blank is maintained in predetermined angular relation to the negative blank, and rotated in grinding contact with the surface thereof while the negative is fed upward along its axis of rotation, observing always that the edge of each disk must overlap the rotational axis of the opposing disk a predetermined extent when any section flatter than a hemisphere is being produced, and further observing that the positive blank is angularly adjusted to the plane of rotation of the negative disk about a point at which the center of curvature of the finished convex lens will be located at the completion of the grinding operation.

To obviate overgrinding, the axial feed of the negative blank is, in every case of curved surface work, limited by a stop which prevents further feed and consequent unnecessary reduction of thickness of the lens and modification of its curvature after a predetermined correct surface has been attained, and in the case of plano surfaces is similarly limited after the required plano surface has been attained.

Surfaces of modified spherical or indeterminate sections are obtainable when the setting of the negative blank is displaced angularly or laterally relative to the positive blank from the normal position for spherical grinding, or when the angular position of the positive spindle is similarly changed, or when overfeed is permitted to occur so that the negative blank grinds the positive blank deeper than the point (center of curvature) about which the angular position of the positive spindle is adjusted.

In conducting the grinding of two glass blanks, the positive and the negative surfaces produced on the opposing blanks are in certain cases exactly counterparts the one of the other. The intersection of the rotational axes (produced) of the opposing disk is on the radius of curvature of the finished convex lens.

In the adaptation of our process to the production of cylindrical, toroidal, hyperbolic, parabolic, and other non-spherical sections, that essential feature of the invention is retained.

It is practicable by this process to grind and polish lenses of very long focus; this indeed was not attempted to be done in the known process in which the positive blank was oscillated across the negative blank about a center always distant from the determined center of curvature of the finished lens, and limited necessarily by the dimensions of the grinding machine. In our machine, any length of focus may be attained ranging from hemispheres to infinity.

It is entirely practicable to substitute an emery or other abrasive disk for one of the glass blanks, subject to observance of certain operative conditions hereinafter described. In practice however it will be preferable almost invariably to grind and polish two glass blanks one against the other, and our process is described herein on the assumption that two such glass blanks are so used.

For the repolishing of existing lenses a cup chuck charged with polishing medium as a polishing pad, is set up on the negative spindle head, with the lens on the positive chuck and the spindles set as for grinding that particular lens; the polishing operation is then conducted as if the lens and the pad were two blanks in process of grinding. A perfect repolishing without any distortion of the original curvature is thus obtained.

In the accompanying drawings:—

Figure 1 is a perspective view of the machine;

Fig. 2 front elevational view of the same;

Fig. 3 transverse vertical section;

Fig. 4 is a sectional plan on line 4—4 Fig. 3;

Fig. 5 fragment elevational view corresponding with Fig. 4;

Fig. 6 is a fragment at perspective view of the feed limit adjuster;

Fig. 7 is a fragment vertical section through one of the blank carriers or chucks on one of the spindle heads;

Fig. 8 is a detail section of the last spindle taken at an angle to that shown in Fig. 7 showing a cup chuck mounted on the head of the spindle;

Fig. 9 is an elevational view of an angle jig fitted to the negative chuck for holding prism blanks;

Figs. 10 to 12 are diagrammatic views explanatory of the procedure in setting up the machine to grind counterpart spherical lenses to a predetermined curvature, and Fig. 13 is a similar view explanatory of the polishing of a finished lens or the repolishing of an old lens;

Figs. 14 and 15 are diagrammatic views explanatory of the setting of the spindles for the grinding of hyperbolic lenses, Fig. 15 being taken in side elevation, and Fig. 16 is a similar view explanatory of the regrinding ("correcting") of a spherical lens to produce a lens of hyperbolic section;

Fig. 17 indicates the setting for the purpose of modifying counterpart spherical forms to obtain parabolas;

Fig. 18 shows the setting up of the machine for the production of concave spheroid and like modified spherical forms.

Fig. 19 is a diagram explaining the system of setting up the machine for the production of spherical lenses.

Figure 20:
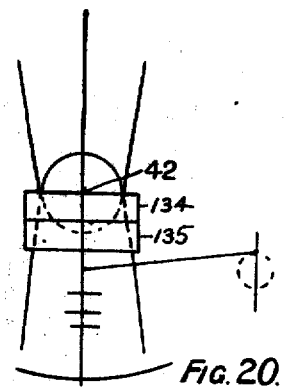

Fig. 20 is a diagrammatic representation of the setting of the machine for the grinding of toroidal sections.

Figure 21:
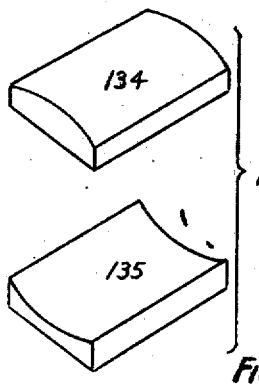
Figure 22:
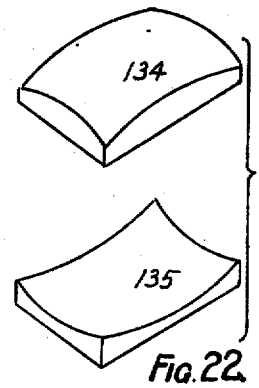

Fig. 21 illustrates two perspective views of counterpart convex and concave cylindrical lenses such as are produced in the first grinding along the major axis of the blanks as described with reference to Fig. 20; and Fig. 22 shows two similar views of the toroidal lenses which result from regrinding the cylindricals (Fig. 21) along the minor axis as described with reference to Fig. 21.

Figure 23:
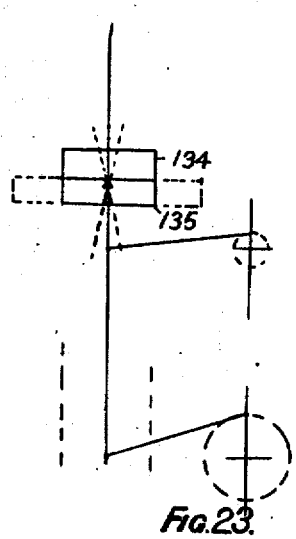

Fig. 23 explains the setting up of the machine for the production of a convex cylindrical surface.

Figure 24:
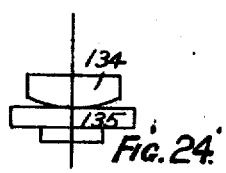

Fig. 24 shows the convex cylindrical blank and the grinding disk or plate as they appear in section through the progress of or at the completion of this operation.

Figure 25:
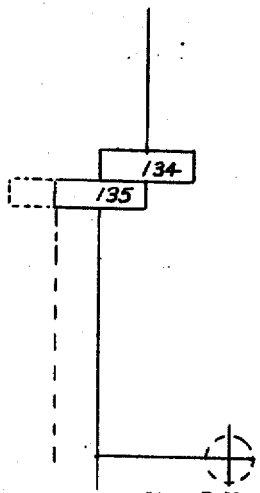

Fig. 25 illustrates the setting up of the machine for grinding and polishing plano surfaces.

Figure 26:
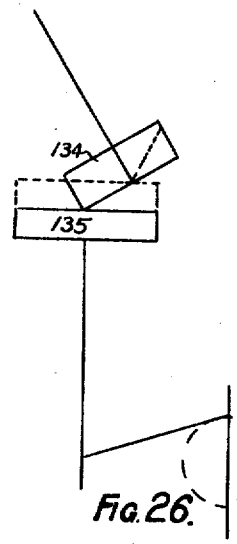

Fig. 26 is a similiar view explanatory of the setting for the grinding of conical forms.

Figures 27, 28:
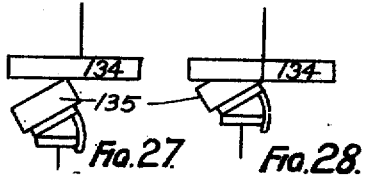

Fig. 27 shows a blank set up on the negative chuck jig and an abradant disk on the positive chuck. Both chucks are rotated and the negative also reciprocated for the purpose of producing a bevel on the negative blank at any required angle, or for producing simple prisms. The position of the parts at the conclusion of the operation is as shown in Fig. 28.

Figure 29:
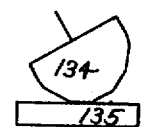

Fig. 29 is a diagrammatic view explanatory of the grinding of facets on a sphere or other regular solid body.

It is practicable to use a negative or a positive disk of emery or other abradant material to grind a glass blank in any of the cases described, but in order to insure correctness of form in a glass lens so ground by means of an abradant disk, it must be observed that the abradant disk shall be of such composition that its rate of wear is approximately identical with the rate of reduction of the glass disk; otherwise the curve produced on the glass will not be the designed curve.

The machine is set up by adjusting the positions of the spindle and disk surfaces to certain gages, having regard to the type, diameter, and curvature of the lens or lenses to be produced.

The spindles are arranged in vertical relation on the machine housing or frame 40, which takes the form of a vertical face plate having a horizontal pivot 42 fixed in it, upon which pivot the positive spindle carrier 43 is mounted. This carrier has journaled bearings in lugs 45 and 49 located some distance apart, in which bearings the positive spindle 46 is rotatable by means of a flexible shaft connected to the universal joint 47 at the head of said spindle, or otherwise. Intermediate of the journal bearings, the spindle 46 is screw threaded, and on this thread runs a sleeve nut 48. Below the lower journal bearings 49 the spindle 46 is fitted with a face plate or chuck 50, upon which the lens blank is mounted in pitch or other setting. The detail of this face plate or chuck is shown in Fig. 7, and the detail of the lower spindle is shown in Fig. 8 with a cup chuck added thereto. The face plate 51 is constructed with a dovetail foot 52 which engages the dovetail end 53 on a socket 54 which is fitted on the lower end of the spindle 46 and secured by a pinching screw 55 or otherwise. The face plate 51 in Fig. 7 corresponds with the chuck 50 in Fig. 3. The sleeve 56 is tapped and runs on the threaded exterior of the socket 54 and takes over the foot 52 of the face plate 51, so that when it is screwed down, the face plate 51 will be tightly held on the dovetail mounting, and the surface of the face plate will be brought exactly square with the axis of the spindle 46. A collar 57 with pinching screw takes against the end of the underside of the bushing of the upper journal bearings 45 and enables the spindle 46 to be set up so that the face plate will be immovable axially upward but rotatably free. By traversing the sleeve 48 on the screwed portion of the spindle and adjusting the collar 57, the spindle 46 is set so that the blank on the positive chuck 50 may be fixed and locked against vertical movement. The center pivot 42 is socketed to carry the tang of a knife edge gage 58 the edge of which is central to the socket, so that when the tang 59 is set in any position in the socket the knife edge will still be in one line with the axis of the pivot 42. This knife edge gage is used only for setting the machine prior to the grinding operation. Its manner of setting will be later described. The tang 59 is preferably made rectangular, and the socket of corresponding rectangular dimensions and a neat fit for the tang.

The positive spindle journal bearings 45 and 49 are connected by a frame member 60 which is slidable transversely of the frame 40 on brackets 61 and 62 projecting from the carrier 43, and can be set transversely out of alinement with the journal bearings of the negative spindle by sliding the frame member 60 out upon the brackets 61 and 62 as far as may be necessary, their transverse displacement from normal center being indicated by a pointer 63 working over a scale 64. At the "0" on this scale the positive spindle is in axial alinement with the negative spindle. The position of the journal bearings 45 and 49 is set by means of pinching screws 65.

The upper part of the housing 40 is open as shown at 66, and a sector 67 form a quide quadrant for a clamp runner 68 with clamping screw 69. The quadrant is graduated preferably in degrees of arc, and a pointer 70 indicates the angular position of the carrier on this scale. A suitable micrometer adjustment may be fitted to the clamp 68 to facilitate fine setting.

An arm 71 is offset at right angles from the carrier 43 at its pivotal center, and this arm carries a slider 72 with upstanding square edge 73. The slider has a straight edge 74 which works over a scale 75 on the arm 71 to indicate lens diameters. The figuring on this scale is to "quarter diameters," that is to say, for instance, the figure "2" while indicating a 2″ diameter lens is situate only ½″ from the axial center 42. The reason for this will be apparent later.

When the edge 74 reads at "0," the square edge 73 is in alinement with the pivot axis 42. This slider is set by a pinching screw 76, and when it is set to any particular measure, the edge 73 of the square is located one quarter of the indicated measure from the center 42.

The carrier 43 has a vertical extension arm 77 below the center 42. This arm is the means by which, when necessary, oscillating motion is applied to the carrier 43 about the center 42 by means of a connecting rod 78 with sleeve length adjuster 79 and adjustable driver 80, turned by a spur wheel 81. This spur wheel is geared into the equal spur wheel 82 from which reciprocating and oscillating motions may be applied to the negative spindle, as will be hereinafter described. The range of the oscillating or reciprocating motions applied through the cranks is determined by the crank pin adjustment, as will be readily understood from the drawing. Drive is applied to either of these wheels 81 and 82 by a flexible shaft or otherwise.

A transverse slot 83 with guide flanges 84 accommodate the slide 85 on which the negative spindle is supported. The slide is rabbeted as shown, and a set screw 86 is provided to lock it at any certain position in the slot. The slide supports a carrier arm 87 fitted with a pivot 88 which is in axial alinement with the housing pivot 42 when the slide is in the central position. The axes of the pivots 42 and 88 are always in the same horizontal plane. Upon the pivot 88 is hung the stage 89 on which the negative journal bearings 90 and 91 are mounted, and this stage may be swung about the pivot 88 and locked in vertical or angular position on the slide by means of a clamp screw 92 working in a sector slot 93, a pointer 94 and quadrant scale 95 marked in degrees of arc being provided to indicate its position, and a micrometer attachment of convenient design (not shown) being also fitted to facilitate fine adjustment. In the pivot 88 is an axial socket 96 adapted to carry the tang of a knife edge 97, said knife edge being in axial alinement with said socket. This knife edge is used only when setting machine prior to the grinding operation. 98 is a pin on the slide 85 adapted to take the end of the adjustable connecting rod 99 which is driven by the adjustable crank pin 100 which is turned by the spur wheel 82. On the carrier 89 is a crank pin 101 adapted to take the end of an adjustable connecting rod 78 which is adapted to be driven by the crank pin 80, which crank pin as before stated, serves also when necessary to apply oscillating motion to the positive carrier 43.

The socket hole 96 extends clear through the pivot 88 and is adapted to carry the tang of a rear stub knife edge 111, see Fig. 4, which is intended to contact for adjustment purposes against the square edge 73 on the offset arm 71 of the positive carrier 43.

Figure 1:
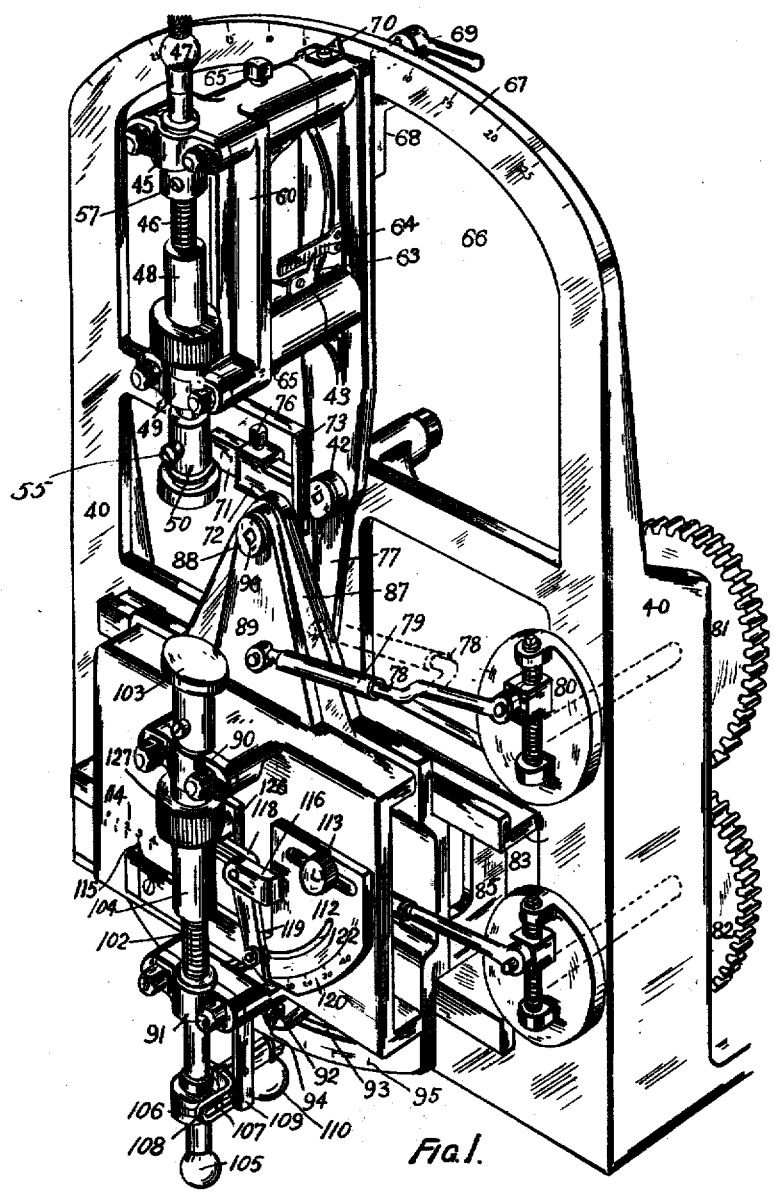
Figure 2:
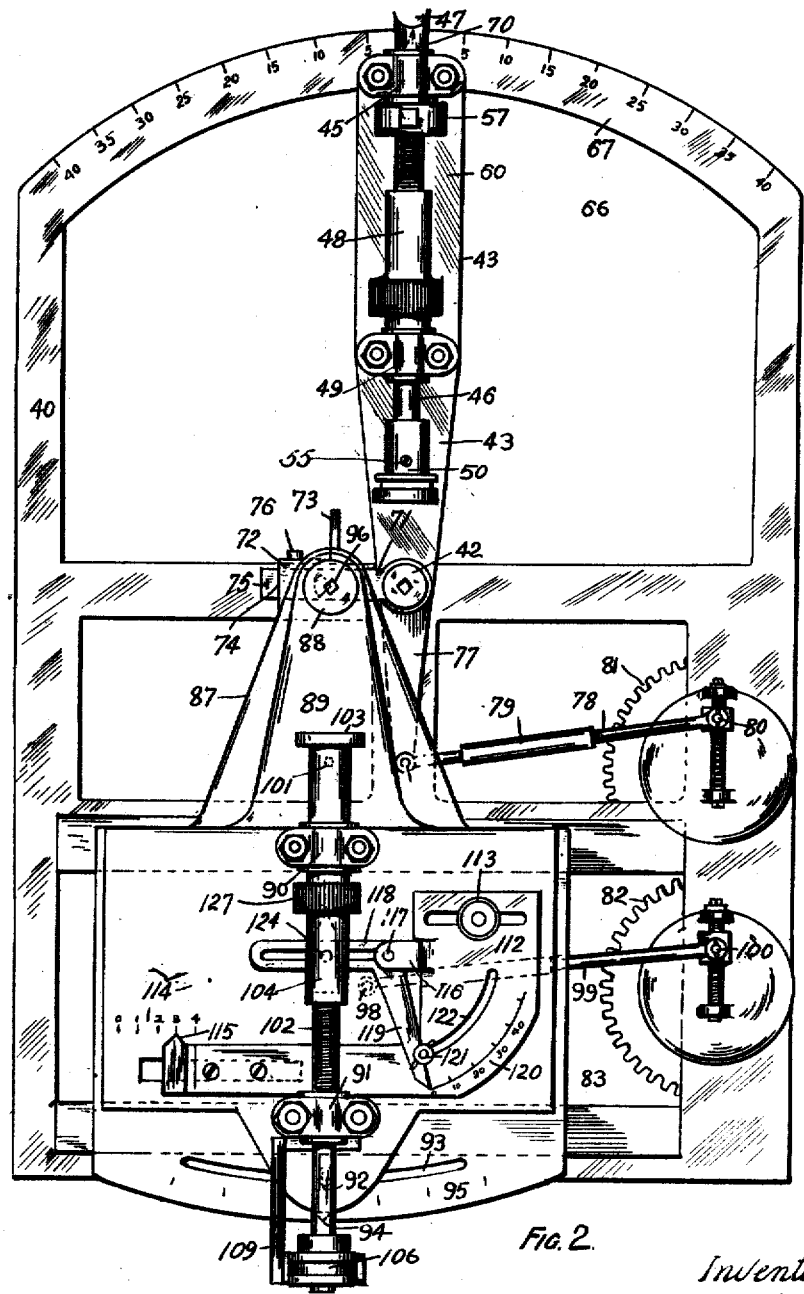

Lugs projecting from the stage 89 carry journal bearings 90 and 91 for the negative spindle 102, and these bearings are in exact alinement with the journal bearings of the positive spindle when both spindles are in the central vertical position shown in Figs. 1 and 3. A face plate 103 or chuck is mounted on the top end of the negative spindle 102, with parts identical with those used for fixing the face plate or chuck 70 on the bottom end of the positive spindle 46, these parts being designated respectively 52', 53', 54', and 56', in Fig. 8.

Below its upper bearings a tapped sleeve 104 runs on the screwed part of the lower spindle 102. The part of the spindle above said thread and the part below it are slidable axially within the bearings 90 and 91 respectively, so that the spindle may be rotated and at the same time slid axially in said bearings. The limit of its upward movement is set by adjusting the sleeve 104 which acts as a stop when it meets the under end of the upper bearing 90. On its lower end the spindle 104 is connected to a flexible driving shaft through a universal joint 105, through which rotary motion may be communicated to it to cause rotation of the chuck or face plate 103 in the same direction as the chuck or face plate 50, or oppositely. Above the universal joint is a running collar 106 with trunnion pins 107 which work in a slotted lever 108 fulcrumed on a bracket arm 109 depending from the stage 89. A weight 110 acts through the lever 108 to move the spindle 102 upward when it is not restrained against upward movement by its stops, and operates to maintain contact of the negative blank with the positive blank during grinding, thus feeding the negative toward the positive as the blanks are ground away.

The limit stop adjustment coacting with the milled flange of the tapped sleeve 104, which effects the correct setting of the stop feed position of the negative spindle 102, consists of a slider 112 traversable across the face of the stage 89 and fixable thereto by means of a jamming screw 113. A scale 114 is marked on the face of the stage 89, and a pointer 115 is fixed on the slider 112. The markings on this scale are to half diameters, for instance, the mark 4 indicates the gage position for a lens four inches in diameter, but the actual measurement of the mark "4" from the mark "0" on the scale is only two inches. The movement of the pointer 115 across the scale 114 indicates the lateral position of the slider 112 on the stage 89 and the lateral displacement of the negative spindle in relation to the pivot 42. A lug 116 projecting from the slider 112 carries a pivot 117 on which a bell crank forked adjusting lever 118 is hung. The adjusting arm 119 of this lever 118 moves over a degree sector scale 120 on the edge of the slider 112, and said arm is fixable in any certain position by means of a wing nut 121 on a pinching bolt which works in a radial slot 122 in the slider. The work arm of this adjusting lever is slotted and acts on an offset pin 124 and thereby operates a vertical slide piece 125 which carries a stop knuckle 126 slidably held in a dovetail horizontal groove 136. This knuckle takes under the flanged head 127 of the negative spindle sleeve 104, and limits downward axial motion of the spindle 102. The positioning of the knuckle stop 126 produced by the angular movement of the slotted work arm after the slider 112 has been set is the correct adjustment for lower limit position of the sleeve 104 so that it will contact with the journal bearing 90 and stop upward feed motion as soon as the negative disk surface has reached the horizontal plane of the pivots 42 and 88.

It will be observed that the positive spindle may be set up at any angle between extreme angular working position (45°) and "0" (vertical position) in the housing, and that that spindle may be adjusted endwise in its journals so that the face of the blank which it carries may be in transverse alinement with the axis of the carrier pivot 42, or may come above or below that point of alinement if so required. Also, that the positive spindle is for certain purposes capable of oscillating motion about the center 42 but is not capable of any reciprocating motion. Also that the negative spindle is so mounted that its vertical position in its journal bearings may be varied, the limit of this vertical movement controlled by a stop with hand setting, its angular position fixed about its carrier pivot 88, that it may be traversed horizontally of the housing, and that it may be oscillated about the pivot 88.

The face plate fitting shown in Fig. 9 consists of a jig table 128 movable about a hinge support 129 and fixable by two clamp screws 130 and 131, the angularity in degrees being indicated by a marked scale 132 on a quadrant 133 which passes across the normally horizontal surface of the face plate 51.

To produce for example a spherical lens, references being had to Figs. 10 to 12, the positive blank 134 is mounted on the chuck 50 and the positive spindle 46 adjusted by means of the collar 57 and sleeve 48 so that the point on the under surface of said blank which is to be the center of the lens about to be produced is on the axis of the pivot 42. This is effected by using the knife edge 58 as a gage. The spindle 46 is then fixed by the collar 57 and the sleeve 48 so that it is no longer movable axially in its journal bearings. The negative blank 135 is now mounted on the negative chuck 103 and the negative spindle allowed to rise in its journal bearings until the top surface of said blank touches the knife edge 97. The slider gage 112 is now set over to the gage mark (lens diameter) on scale 114, and the pointer gage 119 is set to the same gage mark as the pointer 70 on the scale 67, thereby bringing the limit stop knuckle 126 to a corresponding position. The sleeve 104 is now run back on the spindle 102 until the underside of its flanged head 127 comes against the knuckle 126, and it is then set at that position on said spindle by a pinching screw or jam nut. The knuckle 126 is now slid laterally in its dovetail slide 136 to give clearance to allow the spindle 102 and the sleeve 104 to be slid downward. The square edge gage 73 is now set over to the gage mark on its scale 75 indicating lens diameter, and then the positive carrier is set over from the vertical, about the center 42 one fourth the angle of curvature of the required convex lens—that is one fourth the number of degrees contained between radii drawn to opposite points on the periphery of the required lens surface. This done, the positive carrier is fixed at that angle by tightening the screw 69. The slide 85 is now moved laterally until the knife edge 111 contacts with the square edge 73 (see Fig. 11) and the slide is then locked by the pinching screw 86. This lateral adjustment of the negative spindle sets it over from the axial center 42 a distance which is the ratio of the angle of the positive spindle from the vertical on an adjacent side equal to one fourth the diameter of the lens about to be ground. The knife edge gages are now removed and the negative blank allowed to move up and touch with the positive blank and stay in grinding contact with it by the action of the weight gear 108—110. Rotary motion is now applied to the spindles, clockwise to one and counterclockwise to the other, and abradant material is served to the grinding surfaces, and the grinding continued until the feed of the negative spindle is arrested by the contact of the sleeve 104 with the journal bearing 90, at which point grinding ceases automatically, the blanks being then finished to a curvature with the center of curvature located in alinement with the axial center of the pivot 42. Counterpart convex and concave spherical surfaces, of a predetermined curvature are thus obtained simultaneously. The polishing operation is a continuation of the grinding operation, using a polishing medium in the manner shown in Fig. 13.

It will be noted on reference to Figs. 10 to 13 that the rotational axis of the negative blank 135 would if produced, intersect the axis of the positive spindle at a point which is the radial center of the curve of the lens (see Fig. 19), and it will be observed that it is necessary that the diameter of the blank 135 shall be equal to or greater than the diameter of the blank 134.

The process of modifying spherical lenses to produce parabolic lenses is suggested in Fig. 17. Having procured counterpart spherical convex and concave blanks 134 and 135, the same are set up on the positive and negative chucks respectively, with the center of curvature in alinement with the axis of the pivot 42, and with the positive and negative spindle axes both vertical and therefore in alinement, and then fixing the sleeve 104 to prevent upward movement of the negative spindle 102. The negative spindle can move backward against the reaction of the loading weight lever 108, and thus allow the negative blank 135 to "ride" back from the positive blank 134, but neither blank can be advanced toward the other one beyond the set point, which is the center of the original spherical surface and is located in the horizontal plane of the axis of the pivot 42. An oscillating motion is now applied to the stage 89 through the connecting rod 78, the range of swing being set by adjusting the throw of the crank 80 and indicated on the scale 95. Meantime both spindles are maintained in rotation in opposite directions. The result of this operation is that the outer zone of each of the sphericals is ground away, while neither is reduced at the center of curvature, and they are each ultimately brought to a section corresponding to a parabolic section, the dimensions of which are determined by the original dimensions of the spherical blanks and the range of the oscillating motion. It is important to note that this oscillating motion occurs about a center which coincides with the center of the complementary spherical blanks.

Fig. 18 indicates the operation of a process for modifying spherical sections so as to produce lenses of spheroidal or like elongated curved sections, that is lenses having a flatter section in one direction than in another direction at right angles thereto, the shorter section being identical with the original spherical section. This is effected by setting up the already ground counterpart spherical lenses precisely in the same manner as described with reference to Fig. 17, and applying rotary motion to the positive spindle and reciprocating motion to the slides 85, through the connecting rod 99, acting on the pin 98, the stroke of the crank 100 being in this case also adjusted having regard to the dimensions of the finished modified spherical section required. The positive spherical blank will act as a self forming tool to grind the negative spherical blank to spheroid section.

Figs. 20 and 21 refer to the grinding of cylindrical lenses. In setting the machine for this purpose, a blank 134 is mounted on the positive chuck 50 and the positive spindle is set in its journal bearings so that the under face of the blank 134 is brought into contact with the knife gage 58, the fang of which is set in the axial socket in the carrier pivot 42, or is brought below said gage 58. The negative blank 135 being now mounted on the chuck 103, the negative spindle is permitted to rise until the opposed faces of the two blanks come into contact, and then the sleeve 104 is set on the negative spindle 102, to limit feed of the negative blank and arrest grinding as soon as counterpart curved surfaces are produced. The slide 85 is set centrally so that the pivots 42 and 88 are in exact axial alinement. The grinding operation consists in holding the positive blank 134 fixed, and oscillating the stage 89 about the pivot 88 through an arc the length of which is determined with regard to the curvature required. The radius of the convex cylinder thus ground depends upon three factors: viz. (1) the distance of the fixed under surface of the positive blank below the pivot axis 42, (2) the length of the positive blank in the plane of the oscillating motion of the negative blank, and (3) the range of the oscillatory movement of the negative blank or grinder. All three of these adjustments must be determined to enable the setting of the machine for the correct grinding automatically of cylindrical curves to a predetermined radius. Even if the under surface of the positive blank is set in alinement with the center pivot axis 42, about which axis the negative disk or grinder block oscillates, counterpart cylindrical forms are obtained having a radius of curvature located at a point on or above said axial center 42; in this case however, as grinding is continued, the radius shortens, until ultimately the positive blank is reduced to nil at the oscillation center. Throughout the grinding, however, the counterpart cylinders obtained are true cylinders after the grinding has progressed sufficiently far to bring the whole area of the opposed surfaces into contact. It is necessary therefore to set the feed stop of the negative spindle to arrest further feed as soon as the grinding has produced the required radius of curve.

Convex cylinders are obtained by another method. In this case (Fig. 23) the blanks are set face to face on the plane of the axial center of the pivot 42, the positive carrier is oscillated about the axis 42, its spindle being locked against any movement in its journal bearings, and the negative is rotated and at the same time reciprocated through a range which at each movement brings the center of each blank to or slightly past the edge of the other blank.

It is necessary to observe that other types of lenses are procured by a variation in the procedure for the grinding of cylindrical lenses. For instance, if either blank be rotated during the grinding operations already described for cylinders, a toroidal lens and a lens of modified spherical section are obtained. Cylindrical counterpart lenses (Fig. 21) are convertible to toroidal lenses (Fig. 22) by a repetition of the cylindrical grinding process with the cylindrical blanks set on their chucks turned 90° from their original position thereon, and similarly the convex cylinder produced as described with reference to Fig. 23 is convertible to a convex toroidal lens.

Toroidal lenses may also be made direct from flat blanks. In this case, referring to Fig. 26 (which as drawn refers to the grinding of cones), the blanks are mounted and the spindles set up in angular relation, as for producing spherical lenses; the positive blank is rotated, and the negative blank is reciprocated (but not rotated) horizontally, and the positive spindle is set so that it cannot move axially in its journal bearings. The negative spindle is set with freedom to feed upward. A concave toroidal lens is thus obtained, while the positive blank is ground to a hyperbolic section. As in other cases described, the measurements of the finished lenses depend upon a correct setting of positions of the spindles and the range of the reciprocating or oscillating movement (if any) having regard to the diameter of the blanks being operated on.

The grinding of cones is a simple operation, which consists in setting the positive spindle to the appropriate angle, and having mounted the blanks on the chucks, maintaining both spindles in rotation and reciprocating the negative spindle, taking care that the edge of the positive passes up to or slightly over the center of the negative disk on each reciprocation.

Heretofore it has been attempted to grind plano surfaces so as to make them optically true, by rotating one of them while moving the other to and fro across its surface. But it has been found that untrue optical surfaces are thus obtained because the irregular rate of wear of the rotating disk brings it to an uneven surface, and it is therefore rendered incapable of producing a true face on the blank. According to our invention two optically true plano surfaces are obtained simultaneously by grinding two blanks together while both are rotating and one is reciprocated across the other, but always so that it does not at any part of it substantially overlap the axis of rotation of said other blank. This operation may be best understood by reference to Fig. 25 in which the negative blank 135 is shown at the extreme end of its stroke with its edge just overlapping the axis of rotation of the positive blank 134. The operation for the grinding of prisms and bevel edges is mechanically identical, a convenient device for carrying the prism or bevel blanks at the required angle on the negative chuck being shown in Figs. 27 and 28.

In another method of grinding hyperbola lenses, the slide 60 is moved to set the positive spindle 46 over transversely out of the plane in which the negative spindle performs its various motions. This is shown in the diagrammatic view (Fig. 15). The angular position of the positive spindle is set as for spheres; then the positive spindle is moved over as above stated and both spindles are rotated, with freedom to the negative to slide in its journal bearings. A convex and a concave hyperbola are thus obtained, but they are not counterparts. Their measurements depend on the angularity and eccentricity of the positive disk in relation to the negative disk.

Fig. 16 is a sectional diagram explanatory of the grinding of hyperbolas and parabolas from counterpart spherical blanks. During this operation both blanks are rotated, their relative axial positions and feed limits being adjusted with relation to the dimensions and proportions of the sections required. The negative spindle is set over from the position it would occupy if these blanks were to be further ground as sphericals, by moving the slide 85 laterally across the machine so as to bring the point of intersection of the negative spindle axis lower down on the positive spindle for hyperbolas and higher up thereon for parabolas. Hyperbolas are also obtained by increasing the angular position of the positive spindle and retaining the negative spindle in the position set for the original sphericals. The positive spindle is locked against endwise sliding in its journal bearings, but the negative spindle is free to float in its bearings up to the stop feed position, so as to maintain grinding contact between the opposed surfaces. The degree of angular position of the positive spindle and the amount of lateral displacement of the negative spindle from the normal setting to produce the spherical blanks which are required to be converted are both factors which affect the proportions of the curves produced in this operation. Convexes and concaves are produced in this manner but they are not counterparts the one of the other.

For grinding facets on spherical or other non-concave solid forms (see Fig. 29) the blank is mounted on the positive chuck and the positive spindle is set at the angle (relative to axis of blank) of the required facet. The negative chuck carries a grinding surface and it is rotated and reciprocated transversely of its axis. As each facet is completed the positive spindle is unlocked and turned to expose the surface on which the next facet is to be ground, and then locked again, and the grinding of the several facets to complete a belt of facets is thus successively effected. After each belt of facets is completed, the angle of the positive spindle is reset for the next belt of facets, and the same series of operations repeated. A perfectly symmetrical system of facets covering the whole or any part of the blank is thus produced. The negative spindle is free to slide axially during these operations, but as in all other cases the stop operates to limit the feed and therefore to prevent over-grinding.

Where in this specification it is provided that the periphery or edge of one blank must overlap the axis of the opposed blank, it is to be understood that the necessary condition is satisfied when such periphery intersects such axis, but it is impracticable to attain precise accuracy in this particular and it is quite unnecessary to do so. It suffices to set the periphery of one blank very slightly overlapping the axis of the other blank, and this can be done readily. Care must always be exercised when observance of this condition is called for, to insure that the periphery of either blank does at least intersect the center of the opposing blank throughout the grinding operation.

We would have it understood that the descriptions of operations herein particularly set forth which involve our process are not exhaustive of lens grinding operations which are within the scope of our invention. We have applied our method and used a machine constructed to facilitate the work in many ways not herein specified, to produce toroidals, cylinders, hyperbolas, and other sections. In all cases, however, the point of angular adjustment or oscillation of the positive blank is one which at the conclusion of the operation is on the center of the finished convex lens, and always feed is obtained by moving the negative blank (or grinder) axially upward. Whether the blanks are to be rotated, oscillated, or reciprocated, is determined by the type of lens to be produced. In all cases the angular and rectilinear motions occur in the same plane (though in one exceptional case—hyperbolas, Fig. 15—the rotary movements are in parallel planes), and the axial line of the negative spindle if produced intersects the axial line of the positive spindle.

In Fig. 19 the line $x$ is the normal vertical, which is the common axis in which both spindles may be set. The center of the lens $v$ is always located on this line. $y$ is the surface of the negative blank, and $z$ a surface of the opposed positive blank at the commencement of the grinding operation for sphericals. $X$ is the axis of the negative spindle, and $Y$ is the axis of the positive spindle. The axis $X$ cuts the axis $Y$ at the center of the lens $v$ on the surface $z$. 73 is the square edge (see Figs. 4 and 5) set over from the center of the lens $v$ one fourth the required lens diameter, and 111 is the negative carrier knife gage which contacts with the square edge 73 and sets the negative carrier over that distance laterally from the center of curvature $v$ which is the ratio ($w$) of the angle $m$ on the adjacent side $n$. The angle $m$ is equal to the angle $c$, and the side $n$ is one fourth the lens diameter. $a$ is the angle of curvature of the required lens, $b$ half said angle, and $c$ one fourth said angle. The positive carrier is set to the angle $c$ so that the adjacent side $S$, which is a line bisecting the angle $b$, is vertical to the plane of rotation $y$ of the negative blank. The line $S$ is necessarily in alinement with the negative axis $X$, and it cuts the positive axial line $Y$ at the point $T$ which is the radius of curvature of the finished lens surface $U$.

What we claim as our invention and desire to secure by Letters Patent is:—

1. In a machine for grinding lenses, the combination of a frame support, a pivotally mounted frame on said support, a bracket mounted transversely of said pivoted support, a chuck carrying spindle mounted on said bracket and adjustable in an axial direction, a carriage on said support movable in a plane parallel to the plane of movement of the pivoted frame, a second pivoted frame mounted on said carriage, and oscillatable in a plane parallel to the plane of movement of the carriage, a second chuck carrying spindle coöperating with the first named spindle and carried by said second pivoted frame, means for either oscillating said first named pivoted frame or said second pivoted frame and means for reciprocating said carriage.

2. In a machine for grinding lenses, the combination of a frame body support, a chuck carrying spindle mounted for rotation on an axis in a vertical plane and also oscillatable in said plane, a second chuck carrying spindle coöperating with the first named spindle, said second named spindle being mounted for rotation on an axis in a vertical plane, said second spindle also being capable of both reciprocable and oscillatable movements in said plane and means for giving to said spindles the various movements for the purpose described.

3. In a machine for grinding lenses, the combination of a frame support, a spindle carried by said support, said spindle being capable of oscillation about a point near the lower end thereof, said spindle being adjustable axially and also adjustable transversely of its length, a second spindle carried by said frame support, the said second spindle being adjustable axially and capable of both reciprocating and oscillating movements in a plane parallel to the plane of movement of the first named spindle, means for oscillating either of said spindles and means for reciprocating said second spindle transversely of its length.

4. In a machine for grinding lenses, the combination of a frame support, a spindle frame pivoted to said support, spindle carrying brackets projecting outwardly from said pivoted frame, a spindle mounted in said brackets said spindle being adjustable along its axis, and also adjustable transversely of the plane of movement of the pivoted frame and means for oscillating said pivoted frame, with a second spindle coöperating with the first spindle, said spindles carrying suitable chucks for receiving counterpart blanks.

5. In a machine for grinding lenses, the combination of a frame support, a spindle carrying frame pivotally mounted thereon, a spindle carried by said pivoted frame and capable of axial adjustments on said pivoted frame, said spindle being also adjustable transversely of its length, a second spindle mounted on said frame support and axially adjustable thereon, means for imparting to said second named spindle either an oscillating movement about a point adjacent the lower end of the first spindle or a reciprocating movement transversely of its length.

6. In a machine for grinding lenses, the combination of a frame support, a spindle carrying frame pivoted thereon, a bracket projecting outwardly from said pivoted frame, a spindle mounted on said bracket and being adjustable in an axial direction and also transversely of the pivoted frame, a carriage movable on said frame, a pivoted frame on said carriage, a spindle mounted on said second pivoted frame, said second spindle being movable in an upward direction and having an adjustable collar thereon for limiting the upward movement for the purpose described.

7. In a machine for grinding lenses the combination of a frame support, a carriage slidable thereon, a frame pivoted on said carriage, a chuck carrying spindle mounted on said pivoted frame with its axis parallel to the planes of movement of the pivoted frame and the carriage, and a second spindle mounted on said frame support and coöperating with the first named spindle to grind counterpart lens blanks, and means for imparting to said first spindle either oscillating movement or reciprocating movement.

8. In a machine for producing lenses the combination of a main body frame work, a pivotally mounted frame on said frame work, a chuck carrying spindle on said pivoted frame, said spindle being mounted with its axis parallel to the plane of movement of the pivoted frame, said spindle being axially adjustable and also adjustable transversely of the plane of movement of the pivoted frame, a carriage on said frame work reciprocable in a plane parallel to the plane of movement of the pivoted frame, a second pivoted frame mounted on said carriage, said second frame being oscillatable in a plane parallel to the plane of movement of said carriage, a second chuck carrying spindle coöperating with the first named spindle and carried by said second pivoted frame, said second spindle being mounted with its axis parallel to the plane of movement of the carriage, said second spindle being free to move axially in one direction but limited by an adjustable stop as to its movement in the opposite direction, and means for oscillating said pivoted frames and reciprocating said carriage for the purpose described.

9. In a machine for grinding lenses, a main frame support, a carriage reciprocable and adjustable along said main frame, a spindle frame pivoted to said carriage for oscillating movement in a plane parallel to the movement of the carriage, a spindle journaled in said pivoted frame, said spindle being yieldingly movable in one direction but restrained by an adjustable collar, and a coöperating spindle toward which said first named spindle is moved.

10. In a machine for grinding lenses, a main frame support, a frame pivoted on said main frame, a bracket projecting out from said pivoted frame, a chuck carrying spindle frame adjustable on said bracket transversely of the pivoted frame and carrying an axially adjustable spindle therein, means for setting said pivoted frame at various angles to the vertical, means for setting said spindle frame at a predetermined point along said bracket, a second spindle carried by the main frame and coöperating with said first named spindle and means for feeding said second spindle toward the first spindle during the grinding operations.

11. In a lens grinding machine in which lens blanks are carried on the ends of opposed rotatable spindles and feed motion is applied to one of said spindles, a gage for determining the range of feed, said gage consisting of a transverse slide carrying the fulcrum for a bell crank lever, the work arm of which lever co-acts with a slidable stop moving the same axially parallel with said spindle and fixing the feed clearance proportionately to the dimensions of a lens corresponding with the markings on gages to which said slide and lever are set, substantially as described.

12. In a lens grinding machine including two spindles adapted to carry blanks in grinding contact on their adjacent heads, wherein one of said spindles is angularly adjustable and the other of them laterally adjustable in relation to a center located between their adjacent ends, means for setting the laterally adjustable spindle, consisting of a contact on a slidable carrier on which said spindle is supported, a right angle gage arm on the carrier which supports the angularly adjustable spindle, and a right angled slide gage movable on said gage arm and adapted to contact its edge with the stop on said laterally slidable carrier.

13. In a machine for grinding lenses, the combination of a frame, a fixed pivot thereon, a carrier adapted to be angularly set about said pivot, a spindle rotatable in bearings on said carrier about said pivot and adapted to carry a lens blank on its foot above said pivot, another carrier capable of lateral adjustment in relation to said pivot across the lower part of said frame, a spindle supported in journals on a stage hung on a pivot on said laterally adjustable carrier, said pivot being in horizontal alinement with said fixed pivot, and said spindle being adapted to hold a lens blank on the head thereof in contact with said first mentioned lens blank, means for rotating said spindles, means for feeding the lower spindle upward, and means for oscillating either spindle about its pivotal support.

14. A machine for grinding lenses, comprising a housing 40, a horizontal carrier pivot 42 thereon, a positive carrier 43 angularly movable about said pivot 42, a positive spindle 46 rotatable and slidable axially in bearings on said carrier, means for locking said spindle against sliding motion in said carrier, means for mounting a lens blank on the lower end of said spindle, means for oscillating said carrier about said pivot 42, a negative carrier 89 hung and angularly movable about a horizontal carrier pivot 88 on a horizontal slide rest 87, means for fixing and means for reciprocating said rest in its slide, means for oscillating said carrier 89 on said pivot 88, a negative spindle 102 rotatable in bearings on the negative carrier 89, means for mounting a lens blank on the upper end of said negative spindle, means for applying upward axial feed movement to said spindle 102, means for applying rotation to said spindles 46 and 102, a graduated limit stop device for controlling the feed range of the spindle 102, and a graduated gage 73 coacting with a contact 111, for setting the lateral position of the slide rest 87 relatively to the pivotal axis 42.

In testimony whereof we have affixed our signatures in presence of two witnesses.

ALEXANDER COPLAND ROBERTSON.
FRANK VOLK.

Witnesses:
H. C. CAMPBELL,
W. I. DAVIS.

Copies of this patent may be obtained for five cents each, by addressing the "Commissioner of Patents, Washington, D. C."